(12) United States Patent
Guo et al.

(10) Patent No.: US 8,769,513 B2
(45) Date of Patent: Jul. 1, 2014

(54) LATENCY HIDING OF TRACES USING BLOCK COLORING

(75) Inventors: Xiaofeng Guo, Shanghai (CN); Jinquan Dai, Shanghai (CN); Long Li, Shanghai (CN); Zhiyuan Lv, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 2058 days.

(21) Appl. No.: 10/582,427

(22) PCT Filed: Nov. 18, 2005

(86) PCT No.: PCT/CN2005/001960
§ 371 (c)(1),
(2), (4) Date: Jun. 8, 2006

(87) PCT Pub. No.: WO2007/056893
PCT Pub. Date: May 24, 2007

(65) Prior Publication Data
US 2009/0265530 A1    Oct. 22, 2009

(51) Int. Cl.
*G06F 9/45* (2006.01)
(52) U.S. Cl.
USPC .............................. 717/152; 717/154; 717/159
(58) Field of Classification Search
None
See application file for complete search history.

(56) References Cited

U.S. PATENT DOCUMENTS

| | | | | |
|---|---|---|---|---|
| 4,571,678 A | * | 2/1986 | Chaitin | 717/156 |
| 5,774,730 A | * | 6/1998 | Aizikowitz et al. | 717/157 |
| 5,987,259 A | * | 11/1999 | Goebel | 717/152 |
| 6,006,326 A | * | 12/1999 | Panwar et al. | 712/217 |
| 6,016,398 A | * | 1/2000 | Radigan | 717/152 |
| 6,044,221 A | * | 3/2000 | Gupta et al. | 717/151 |
| 6,305,014 B1 | * | 10/2001 | Roediger et al. | 717/154 |
| 6,598,222 B2 | * | 7/2003 | Uchihira et al. | 717/154 |
| 6,732,260 B1 | * | 5/2004 | Wang et al. | 712/237 |
| 6,785,796 B1 | | 8/2004 | Damron et al. | |

(Continued)

FOREIGN PATENT DOCUMENTS

CN          1561480 A      1/2005
WO     WO2005/062170 A2   7/2005

OTHER PUBLICATIONS

Change et al., IMPACT: An Architectural Framework for Multiple-Instruction-Issue Processors, published by ACM 1991, pp. 266-275.*

(Continued)

*Primary Examiner* — Tuan Q. Dam
*Assistant Examiner* — Zheng Wei
(74) *Attorney, Agent, or Firm* — Blakely, Sokoloff, Taylor & Zafman LLP

(57) ABSTRACT

An embodiment of the present invention is a technique to hide latency in program traces. Blocks of instructions between start and end of a critical section are associated with color information. The blocks correspond to a program trace and containing a wait instruction. The wait instruction is sunk down the blocks globally to the end of the critical section using the color information and a dependence constraint on the wait instruction.

28 Claims, 11 Drawing Sheets

(56) References Cited

U.S. PATENT DOCUMENTS

| | | | |
|---|---|---|---|
| 7,290,239 B1* | 10/2007 | Singh et al. | 716/18 |
| 7,516,312 B2* | 4/2009 | Wang et al. | 712/237 |
| 7,555,634 B1* | 6/2009 | Thatipelli et al. | 712/216 |
| 7,752,611 B2* | 7/2010 | Li et al. | 717/151 |
| 7,908,597 B2* | 3/2011 | Nishiyama et al. | 717/152 |
| 2002/0095668 A1* | 7/2002 | Koseki et al. | 717/157 |
| 2004/0111708 A1* | 6/2004 | Calder et al. | 717/131 |
| 2004/0187101 A1* | 9/2004 | Inagaki et al. | 717/159 |
| 2004/0193856 A1* | 9/2004 | Wang et al. | 712/238 |
| 2005/0108695 A1* | 5/2005 | Li et al. | 717/144 |
| 2005/0108696 A1* | 5/2005 | Dai et al. | 717/151 |
| 2005/0149916 A1* | 7/2005 | Shpeisman et al. | 717/140 |

OTHER PUBLICATIONS

Midkiff et al., Compiler Algorithms for Synchronization, Published by IEEE Transactions on Computers, Col. C-36, No. 12, Dec. 1987, pp. 1485-1497.*

Li et al., Automatic Multithreading and Multiprocessing of C Programs for IXP, published by PPoPP '05, Jun. 15-17, 2005, pp. 132-141.*

* cited by examiner

US 8,769,513 B2

LATENCY HIDING OF TRACES USING BLOCK COLORING

CROSS-REFERENCE TO RELATED APPLICATION

This application is a National Phase application of, and claims priority to, International Application No. PCT/CN2005/001960, filed Nov. 18, 2005, entitled "LATENCY HIDING OF TRACES USING BLOCK COLORING".

BACKGROUND

1. Field of the Invention

Embodiments of the invention relate to the field of software, and more specifically, to program transformation.

2. Description of Related Art

Modern network processors generally have asynchronous, or non-blocking, memory access operations, so that other computation work may be overlapped with the latency of the memory accesses. For instance, every memory access instruction is non-blocking and is associated with an event signal. That is, when a memory access instruction is issued, other instructions following it may continue to run while the memory access is in flight, until a wait instruction for the associated signal blocks the execution. Once the memory access is completed (e.g., its result is available), the associated signal is asserted by the hardware and the wait instruction then clears the signal and returns to execution. Consequently, all the instructions between the memory access instruction and the wait instruction may be overlapped with the latency of the memory access. In addition, modern network processors usually have a highly parallel architecture and are multi-threaded. For example, whenever a new packet arrives, a series of tasks (e.g., receipt of the packet, routing table look-up, and en-queuing) is performed on that packet by a new thread. In such a parallel programming paradigm, accesses to global resources (e.g., memory) are protected by critical sections to ensure the mutual exclusiveness and synchronizations between threads Together with the asynchronous memory access operations, the multi-threading/multi-processing programming model helps hide the long memory access latency, by overlapping the latency of the memory access in one thread with the latency of memory accesses and/or the computations in other threads. However, if both the memory access and its associated wait instruction are contained in the same critical section, the memory latency hiding is greatly impacted due to the sequential execution of the critical section between threads. This may result in performance degradation.

BRIEF DESCRIPTION OF THE DRAWINGS

Embodiments of invention may best be understood by referring to the following description and accompanying drawings that are used to illustrate embodiments of the invention. In the drawings.

DESCRIPTION

Figure 1A:
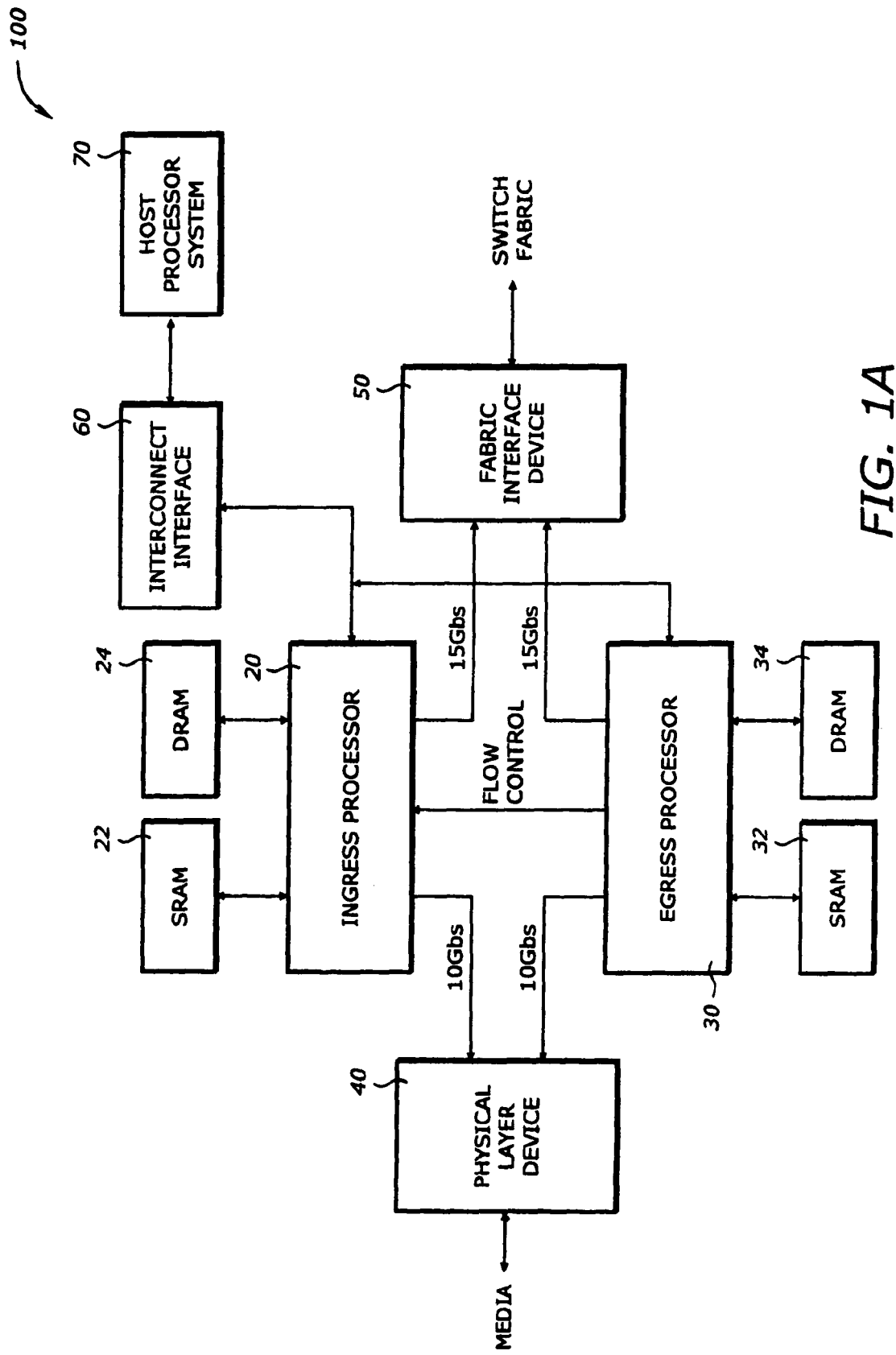
FIG. 1A is a diagram illustrating a system in which one embodiment of the invention can be practiced.

An embodiment of the present invention is a technique to hide latency in program traces. Blocks of instructions between start and end of a critical section are associated with color information. The blocks correspond to a program trace and containing a wait instruction. The wait instruction is sunk down the blocks globally to the end of the critical section using the color information and a dependence constraint on the wait instruction.

In the following description, numerous specific details are set forth. However, it is understood that embodiments of the invention may be practiced without these specific details. In other instances, well-known circuits, structures, and techniques have not been shown to avoid obscuring the understanding of this description.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

Elements of embodiments of the invention may be implemented by hardware, firmware, software or any combination thereof. The term hardware generally refers to an element having a physical structure such as electronic, electromagnetic, optical, electro-optical, mechanical, electromechanical parts, components, or devices, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), an erasable programmable ROM (EPROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine readable code to perform the operations described in the following. The term "data" here refers to any type of information that is encoded for machine-readable purposes. Therefore, it may include program, code, data, file, etc.

All or part of an embodiment of the invention may be implemented by hardware, software, or firmware, or any combination thereof The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

One embodiment of the invention may be described as a process, which is usually depicted as a flowchart, a flow diagram, a structure diagram, or a block diagram. Although a flowchart may describe the operations as a sequential process, many of the operations can be performed in parallel or concurrently. A loop or iterations in a flowchart may be described by a single iteration. It is understood that a loop index or loop indices or counter or counters are maintained to update the associated counters or pointers. In addition, the order of the operations may be re-arranged. A process terminates when its operations are completed. A process may correspond to a method, a program, a procedure, etc. A block diagram may contain blocks or modules that describe an element, an item, a component, a device, a unit, a subunit, a structure, a method, a process, a function, an operation, a functionality, or a task, etc. A functionality or an operation may be performed automatically or manually.

FIG. 1A is a diagram illustrating a system 10 in which one embodiment of the invention can be practiced. The system 10 includes an ingress processor 20, an egress processor 30, a physical layer device 40, a fabric interface device 50, an interconnect interface 60, and a host processor system 70. Note that the system 10 may include more or less than the above elements. The system 10 represents an Ethernet processing unit for a number of network protocols or standards such as Synchronous Optical Network (SONET), Synchronous Digital Hierarchy (SDH), Asynchronous Transfer Mode (ATM), etc.

The ingress processor 20 may perform a number of network tasks such as segmentation and re-assembly (SAR), classification, metering, policing, initial congestion management, etc. The egress processor 30 may perform functions such as traffic shaping, etc. The ingress and egress processors 20 and 30 may be the same or different. They may be network processors, digital signal processors, controllers, or any processors that may perform network functions. In one embodiment, the ingress and egress processors 20 and 30 are multi-threaded network processors. They may support a wide variety of wide are network (WAN) and local area network (LAN) with speeds ranging from Optical Carrier Level 3 (OC-3) to OC-192, or 155.52 Megabits per second (Mbps) to 10 Gigabits per second (Gbps). Each of the ingress and egress processors 20 and 30 may have a number of integrated micro-engines. Each micro-engine may be configured to have multiple threads (e.g., 4 or 8). In addition, they may include integrated core processor, cryptographic units, dynamic random access memory (DRAM) interfaces, static random access memory (SRAM) interfaces, media switch fabric interface, interconnect interface, etc. The ingress processor 20 may have interfaces to an SRAM bank 22 and a DRAM bank 24. The SRAM bank 22 may include a number of quad data rate (QDR) SRAM devices to store fast access network data such as queues and tables. The DRAM bank 24 may include a number of high performance DRAM devices to store packet data, program, or other data. Similarly, the egress processor 30 may have interfaces to an SRAM bank 32 and a DRAM bank 34 with similar functionalities. The egress processor 30 may provide flow control to the ingress processor 20.

The physical layer device 40 may provide interface to physical layer data. It may support various modes of operation for transport of Synchronous Transport Signal (STS)-192c/Synchronous Transport Module (STM) 64c and 10 Gigabit Ethernet, high level data link control (HDLC) frame, Packet over SONET (POS), or generic framing procedure (GFP) packet formatting. It may include internal mapping engines to provide the required formatting and maintenance of packet data into the STS-192c/STM 64c SONET/SDH frame payload. It may include 10 Gigabit media access controller (MAC) to perform frame encapsulation, verification, flow control, statistics management.

The fabric interface device 50 may provide interface to a switch fabric that may be connected to a network. The interconnect interface 60 may provide interface to interconnect such as peripheral component interconnect (PCI). The host processor system 70 may provide control function or program development. It may be used to develop code to be downloaded or transferred to the program memory of the ingress or egress processors 20 and 30.

Figure 1B:
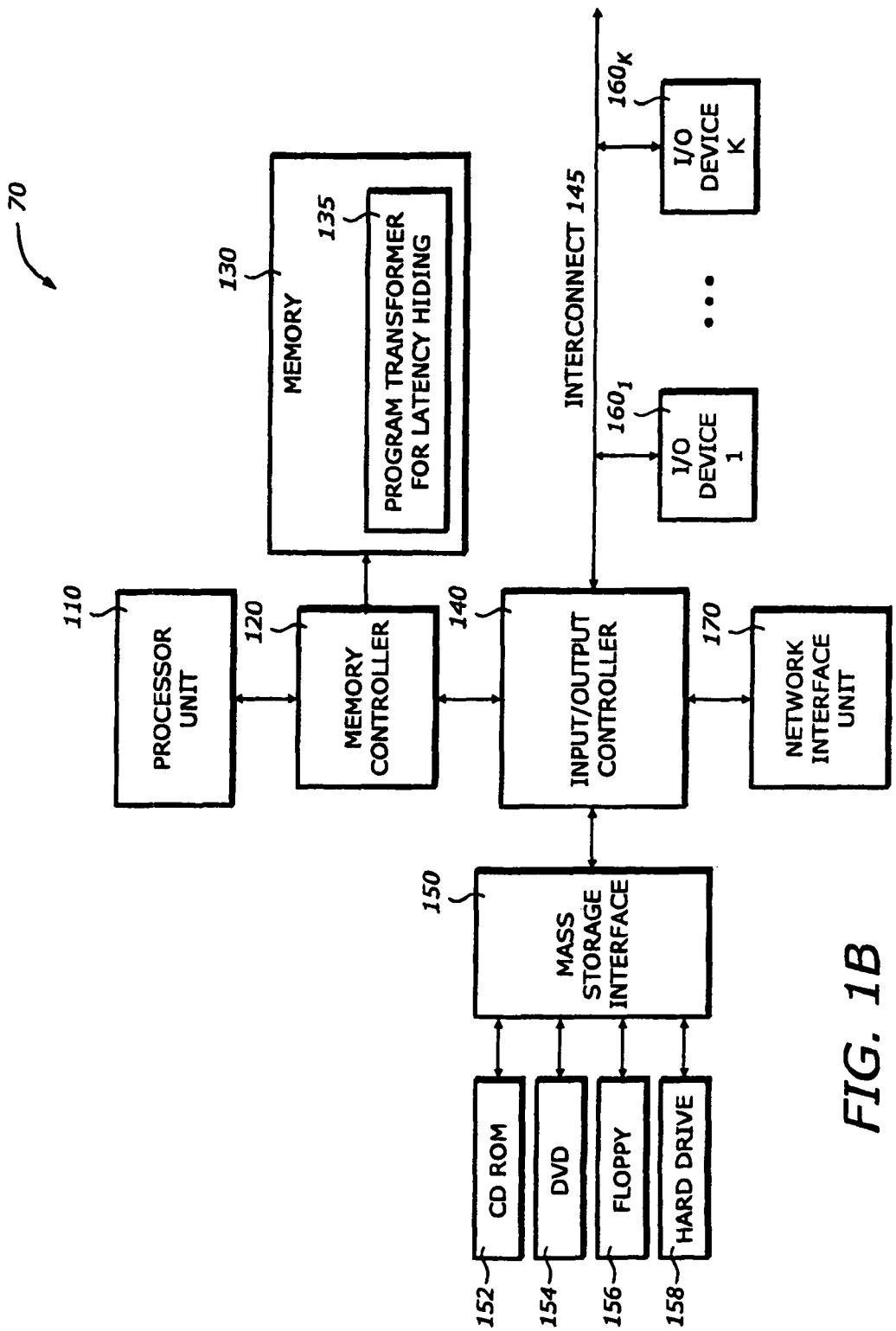
FIG. 1B is a diagram illustrating a host processor system according to one embodiment of the invention.

FIG. 1B is a diagram illustrating a host processor system 70 according to one embodiment of the invention. The system 70 includes a processor unit 110, a memory controller (MC) 120, a main memory 130, an input/output controller (IOC) 140, an interconnect 145, a mass storage interface 150, and input/output (I/O) devices 160$_1$ to 160$_K$.

The processor unit 110 represents a central processing unit of any type of architecture, such as processors using hyper threading, security, network, digital media technologies, single-core processors, multi-core processors, embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The MC 120 may provide control and configuration of memory and input/output devices such as the main memory 130 and the IOC 140. The MC 120 may be integrated into a chipset that integrates multiple functionalities such as graphics, media, isolated execution mode, host-to-peripheral bus interface, memory control, power management, etc. The MC 120 or the memory controller functionality in the MC 120 may be integrated in the processor unit 110. In some embodiments, the memory controller, either internal or external to the processor unit 110, may work for all cores or processors in the processor unit 110. In other embodiments, it may include different portions that may work separately for different cores or processors in the processor unit 110.

The main memory 130 stores system code and data. The main memory 130 is typically implemented With dynamic random access memory (DRAM), static random access memory (SRAM), or any other types of memories including those that do not need to be refreshed. The main memory 30 may include multiple channels of memory devices such as DRAMs. It may include a compiler or program translator or program transformer 135 to compile, translate, or transform the program code to be used by the egress or ingress processor 20 or 30 shown in FIG. 1A. In particular, it includes a compiler to perform latency hiding using a coloring approach.

The IOC 140 may have a number of functionalities that are designed to support I/O functions. The IOC 140 may also be integrated into a chipset together or separate from the MC 120 to perform I/O functions. The IOC 140 may include a number of interface and I/O functions such as peripheral component interconnect (PCI) bus interface, processor interface, interrupt controller, direct memory access (DMA) controller, power management logic, timer, system management bus (SMBus), universal serial bus (USB) interface, mass storage interface, low pin count (LPC) interface, etc.

The interconnect 145 may provide interface to peripheral devices. The interconnect 145 may be point-to-point or connected to multiple devices. For clarity, not all the interconnects are shown. It is contemplated that the interconnect 145 may include any interconnect or bus such as Peripheral Component Interconnect (PCI), PCI Express, Universal Serial Bus (USB), and Direct Media Interface (DMI), etc. In particular, the interconnect 145 interfaces to the interconnect interface 60 (FIG. 1A) to allow the processor unit 110 to communicate with the ingress or egress processor 20 or 30.

The mass storage interface 150 may provide interface to mass storage devices that store archive information such as code, programs, files, data, and applications. The mass storage device may include compact disk (CD) read-only memory (ROM) 152, digital video/versatile disc (DVD) 154, floppy drive 156, and hard drive 158, and any other magnetic or optic storage devices. The mass storage device provides a mechanism to read machine-accessible media.

The I/O devices 160$_1$ to 160$_K$ may include any I/O devices to perform I/O functions. Examples of I/O devices 160$_1$ to 160$_K$ include controller for input devices (e.g., keyboard, mouse, trackball, pointing device), media card (e.g., audio, video, graphic), network card, and any other peripheral controllers.

One embodiment of the invention involves program traces that have accesses to a critical section (CS). Critical section is a common synchronization problem. There are a number of solutions to a critical section problem. One popular solution is the use of semaphore. Semaphore may be implemented by using a wait instruction before entering a CS and a signal instruction after leaving a CS.

Figure 2A:
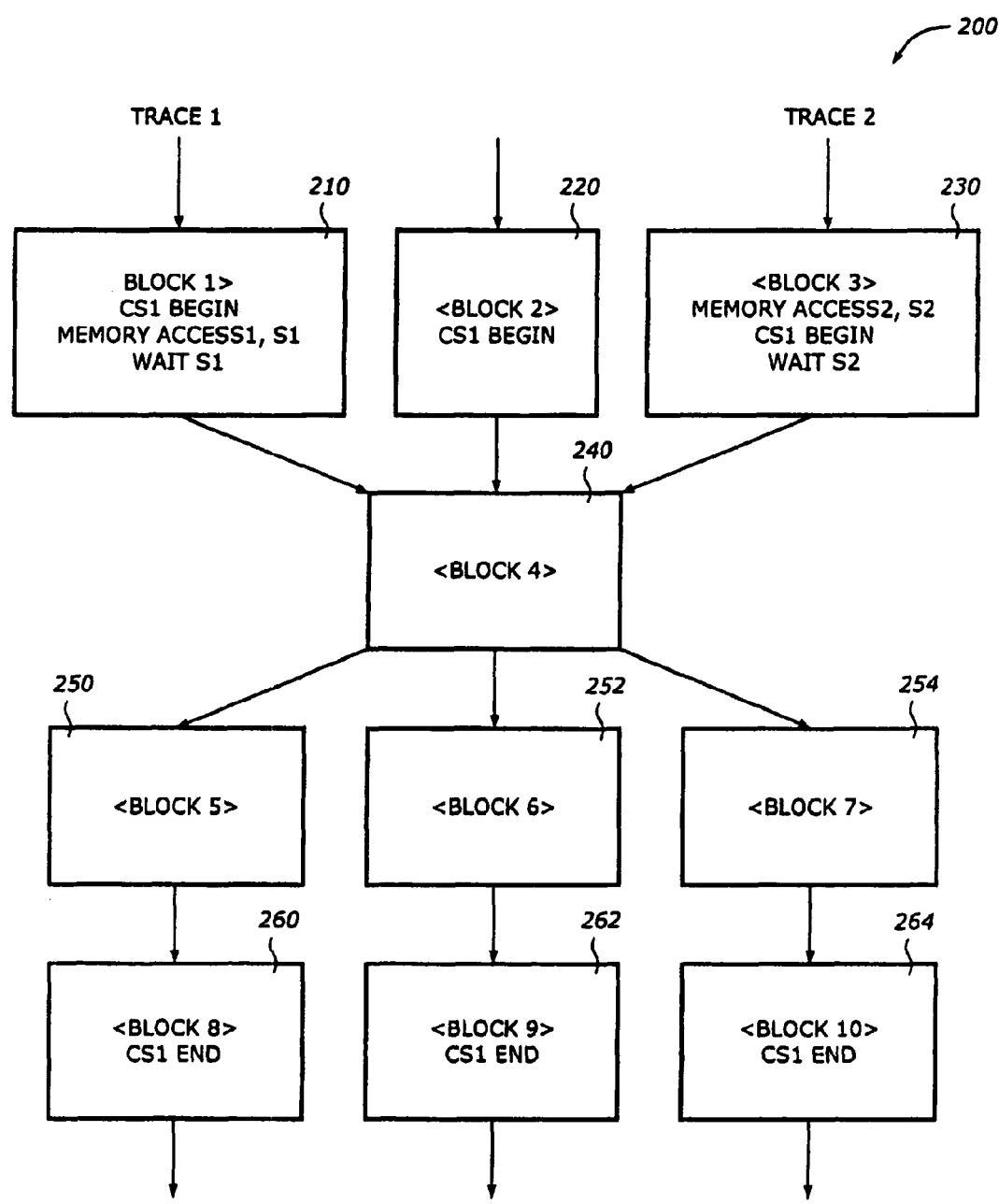
FIG. 2A is a diagram illustrating a program module of program traces with a critical section according to one embodiment of the invention.

FIG. 2A is a diagram illustrating a program module 200 of program traces with a critical section according to one embodiment of the invention. The program module 200 provides an example of multiple program traces having a critical section (CS) 1. The program module 200 includes blocks 1, 2, 3, 4, 5, 6, 7, 8, 9, and 10 referenced by the numeral labels 210, 220, 230, 240, 250, 252, 254, 260, 262, and 264, respectively.

Trace 1 includes blocks 1 210, block 4 240, block 5 250, and block 8 260. Trace 2 includes block 3 230, block 4 240, block 7 254, and block 10 264. The critical section 1 (CS1) includes blocks 1 through 10 but only block 4 240, block 5 250, block 6 252, and block 7 254 are colored. The CS1 begins at block 1 210, block 2 220, and block 3 230. The CS1 ends at block 8 260, block 9 262, and block 10 264.

In block 1 210, there is a memory access mem1 and a wait instruction "wait s1". The order of the instructions is "CS1 begin", "memory access 1", and "wait s1". The memory access "mem1" is in the same critical section as the "wait s1" instruction, i.e., "wait s1" is associated with the memory access "mem1". In block 3 230, there is a memory access "mem2" and a wait instruction "wait s2". The order of the instructions is "memory access 2", "CS1 begin", and "wait s2". The memory access "mem2" is associated with the wait instruction "wait s2" but is not in the same critical section with wait s2. Therefore, "wait s2" is not colored.

In this example, since the wait instruction "wait s1" is in the same critical section with the memory access "mem1", the latency of the memory access "mem1" cannot be overlapped with the latency and/or the computations of other threads. Therefore, latency hiding using multiple threads or multiple processes is not possible. To provide latency hiding, it is necessary to move, or to sink, the wait instruction "wait s1" out of the critical section whose associated memory access is "mem1". This is done for all wait instructions in all program traces that are in the same critical sections with the associated memory accesses.

One embodiment of the invention sinks the wait instructions globally and speculatively based on the program traces using a coloring approach. This may be accomplished by two stages. In the first stage, the compiler colors, or assigns unique codes to, the basic blocks and the wait instructions based on the program traces and the critical sections. In the second stage, the compiler sinks the wait instructions down globally, i.e., across basic blocks, and speculatively, such that the wait instructions are in those traces are moved out of the associated critical sections.

Figure 2B:
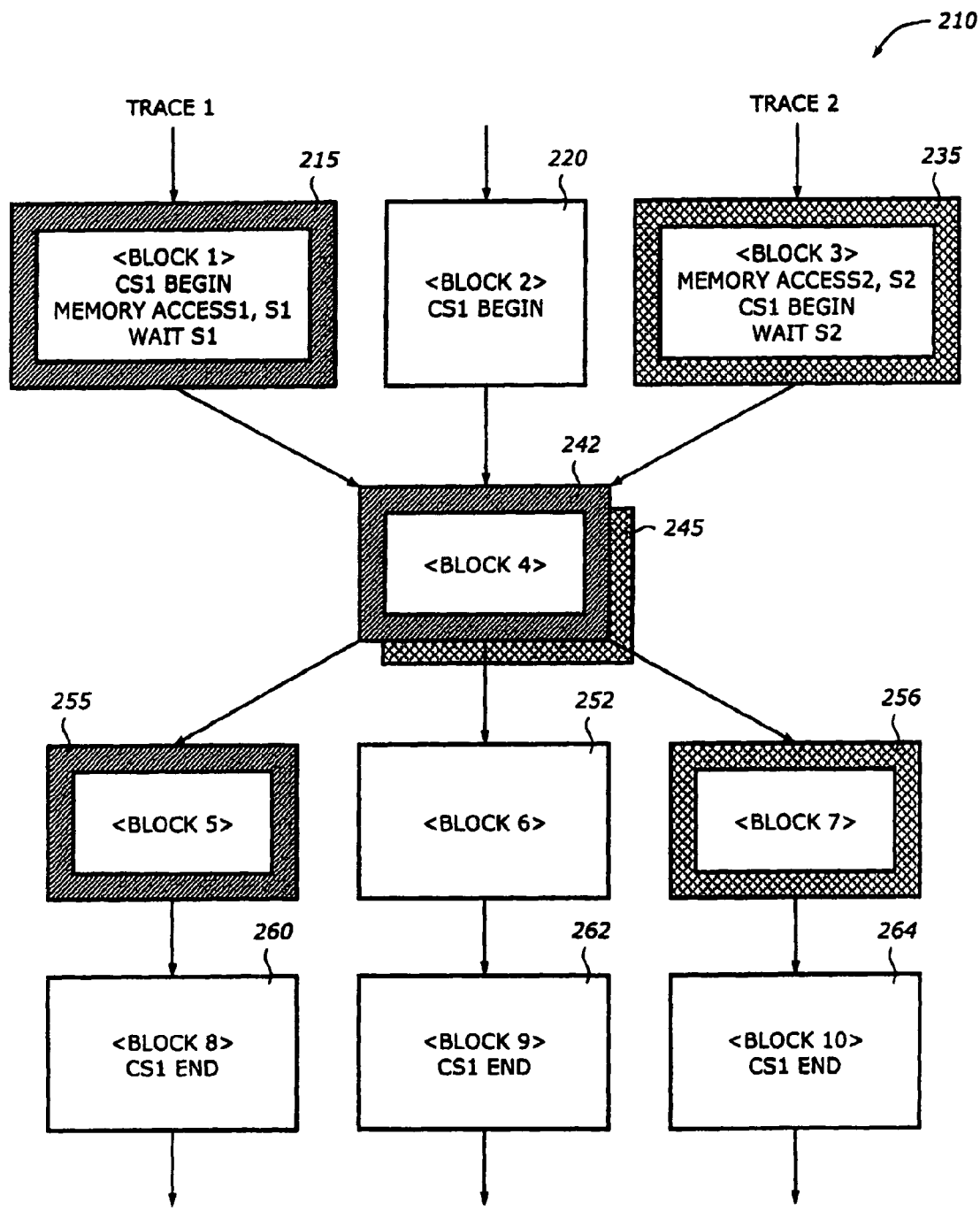
FIG. 2B is a diagram illustrating coloring blocks in the program traces according to one embodiment of the invention.

FIG. 2B is a diagram illustrating coloring blocks in the program traces according to one embodiment of the invention. FIG. 2B illustrates the first stage applied to the program module 200 shown in FIG. 2A.

Block 1 210, block 4, 240, and block 5 250 in trace 1 are colored to become block 1 215, block 4 242, and block 5 255, respectively. Each of these blocks is colored with the same color, or is assigned with the same code. Block 8 260 in trace 1 is not colored because it is the last block of the critical section 1. Block 3 230, block 4 240, and block 7 254 in trace 2 are colored to become block 3 235, block 4 245, and block 7 256, respectively. Each of these blocks is colored with the same color, or is assigned with the same code. The color of the blocks in trace 2 is different than the color of the blocks in trace 1. Note that block 4 has two colors corresponding to blocks 4 242 and 245 because it belongs to two different traces. Block 10 264 in trace 2 and block 9, 262 are not colored because they are the last blocks in CS1.

The wait instruction "wait s1" in the block 1 215 is also colored with the same color as the block 1 215 because it is in the same critical section CS1 with the associated memory access "mem1". The wait instruction "wait s2" in the block 3 235 is empty because it is not in the same critical section with the associated memory access "mem2".

The association of the blocks in the program traces with the color information may be carried out by a coloring technique described by the following pseudo-code. The pseudo-code uses a C-like language.

---

Input: the program flow graph and the selected traces
Output: BlockColorSet: basic block b → the set of colors for the blocks
        WaitColorSet: wait instruction w → the set of colors
        for the wait instructions
        MemoryAccess2Waits: memory access -> associated
        wait instructions
ncolors = 0;
inCrticalSection = inCrticalSectionNow = false;
for (each trace t, where t is a sequence of basic blocks $b_1 \to b_2 \to ... \to b_n$)
{
for (j from n to 1, where basic block $b_j$ is a sequence of instructions $i_1 \to i_2 \to ... \to i_m$)
    {
        inCrticalSection = inCrticalSectionNow;
        if (inCrticalSection == true)
            BlockColorSet[$b_j$] += ncolors;
        for (k from m to 1)
        {
            if (instruction $i_k$ is critical section begin)
            {
                inCrticalSection = inCrticalSectionNow = false;
                WaitSet = { }
            }
            else if ($i_k$ is critical section end)
            {
                inCrticalSectionNow = true;
                ncolors ++;
            }
            else if (inCrticalSection == true)
            {
                if ($i_k$ is a wait instruction)
                    WaitSet += $i_k$;
                else if ($i_k$ is a memory access and its associated
                    wait instruction w is in WaitSet)
                {
                    WaitColorSet[w] += ncolors;
                    MemoryAccess2Waits[$i_k$] += w;
                }
            }
        }
    }
}

---

Blocks are colored when they are in the critical sections and on traces. The color of a block or blocks is not related to the color of the wait instruction. In the above pseudocode, the colors of the blocks are saved in the BlockColorSet[ ] array. The colors of the wait instructions are saved in the WaitColorSet[ ] array. The color of a wait instruction depends on the two conditions: (1) the wait instruction is in a critical section and on a trace or traces, and (2) any of its associated memory accesses are in the same critical section and on the same trace or traces.

After the blocks and the wait instructions are colored, the wait instructions are moved out of the corresponding critical sections. This may take place along the sequence of the blocks of each of the program traces. The sinking of the wait instructions may be carried out by a pseudo-code as follows. In the following pseudo-code, an instruction is ready when it may be sunk down without any dependence constraint. An instruction is not ready when it may not be sunk down due to dependence constraints.

---

Input: the program flow graph
        the basic block b with multiple predecessors
        the coloring information
Output: the program flow graph after speculative code motion
for (each predecessor p of basic block b)
{
    if (BlockColorSetf[p] is not empty)
    {
        for (each instruction i that is in block p and is not in SinkSet)
        {
            if (i is an instruction of wait s , i is ready in p,
            and either i does not exit or is not ready in some of
            the predecessors of b)
            {
                if (the intersection of BlockColorSet[p] and
                    WaitColorSet[i] is not empty)
                {
                SinkSet += i;
                for (each predecessor q of b where i does not exit or
                is not ready)
                    insert an instruction of send signal s into the end
                    of q;
                }
            }
        }
    }
}
Insert the instructions in SinkSet into the beginning of b;

---

Note that in the above pseudo-code, the BlockColorSet[p] contains the block color of the block p and the WaitColorSet[i] contains the wait color of the wait instruction i. If the intersection of these two sets is not empty, it means that the wait instruction i has the same color as the block p, and therefore it may be speculatively sunk down.

Figure 3A:
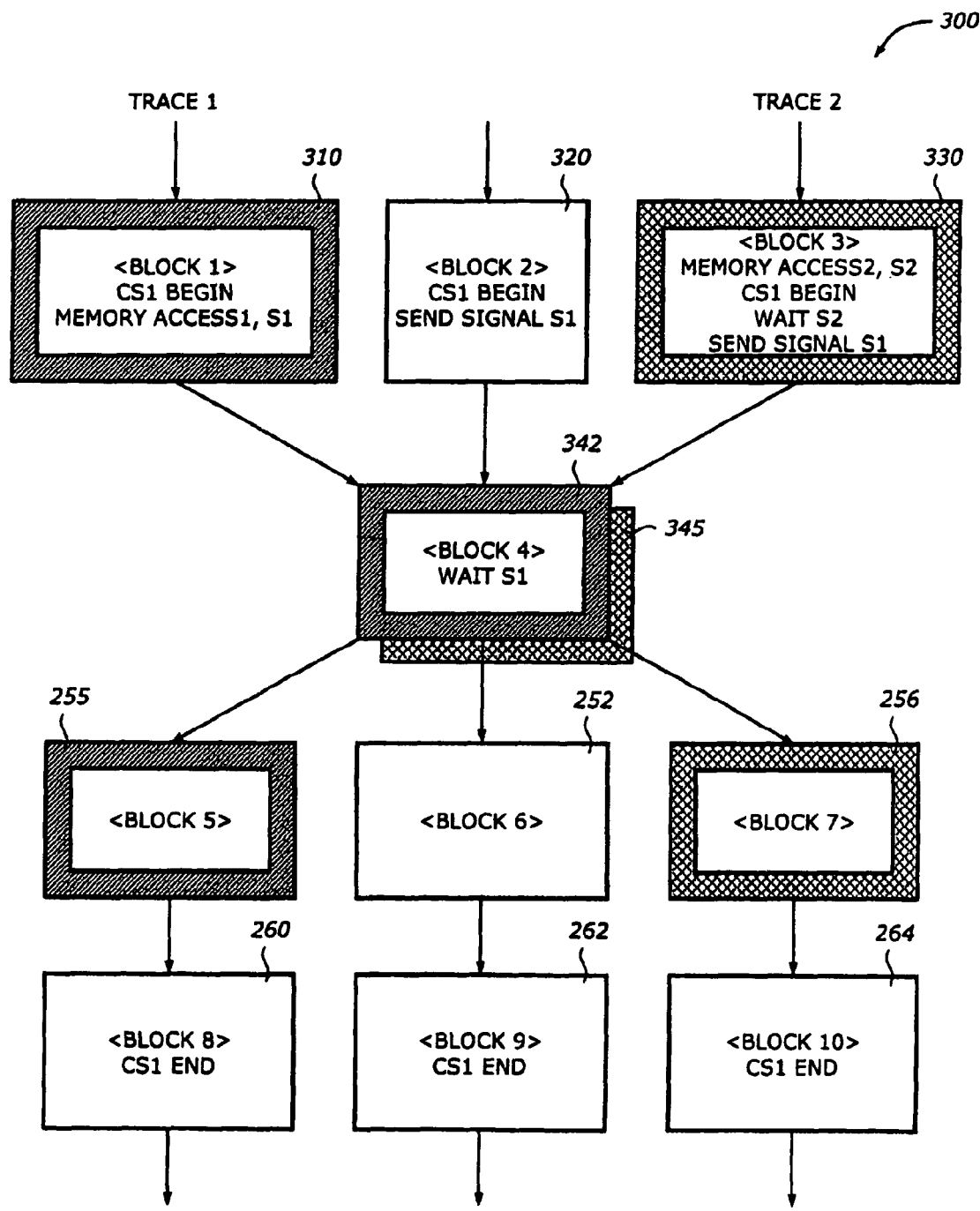
FIG. 3A is a diagram illustrating speculative moving of wait instruction according to one embodiment of the invention.

FIG. 3A is a diagram illustrating speculative moving of wait instruction according to one embodiment of the invention. FIG. 3A shows a transformation from FIG. 2A. Block 1 215, block 2 220, block 3 235, blocks 4 242 and 245 in FIG. 2A now become block 1 310, block 2 320, block 3 330, blocks 4 342 and 345, respectively.

The wait instruction "wait s1" is moved from block 1 310 to block 4 342. Since this wait instruction "wait s1" is eventually moved out of the critical section CS1, compensation code is inserted in block 2 320 and block 3 330 because the blocks are the predecessor blocks of blocks 4 342 and 345. In one embodiment, the compensation code is the "send signal s1" instruction.

Figure 3B:
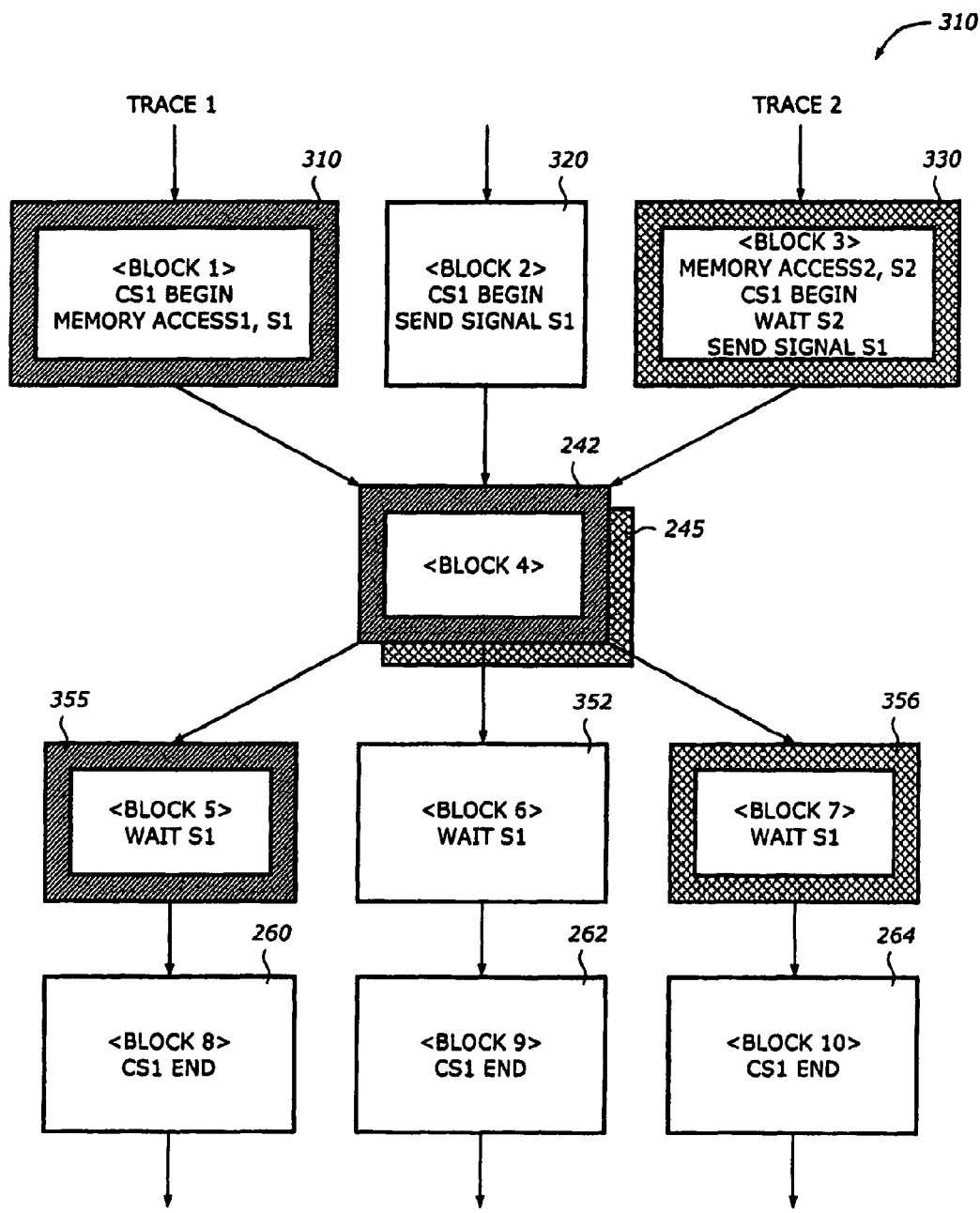
FIG. 3B is a diagram illustrating intermediate moving of wait instruction according to one embodiment of the invention.

FIG. 3B is a diagram illustrating intermediate moving of wait instruction according to one embodiment of the invention. Block 5 255, block 6 252, and block 7 256 in FIG. 2A become block 5 355, block 6 352 and block 7 356, respectively. Blocks 4 342 and 345 in FIG. 3A become blocks 2 242 and 245.

The wait instruction "wait s1" is moved from block 4 242 to block 5 355, block 6 352, and block 7 356 because blocks 4 242 and 245 are the predecessor blocks of block 5 355, block 8 352, and block 7 356.

Figure 3C:
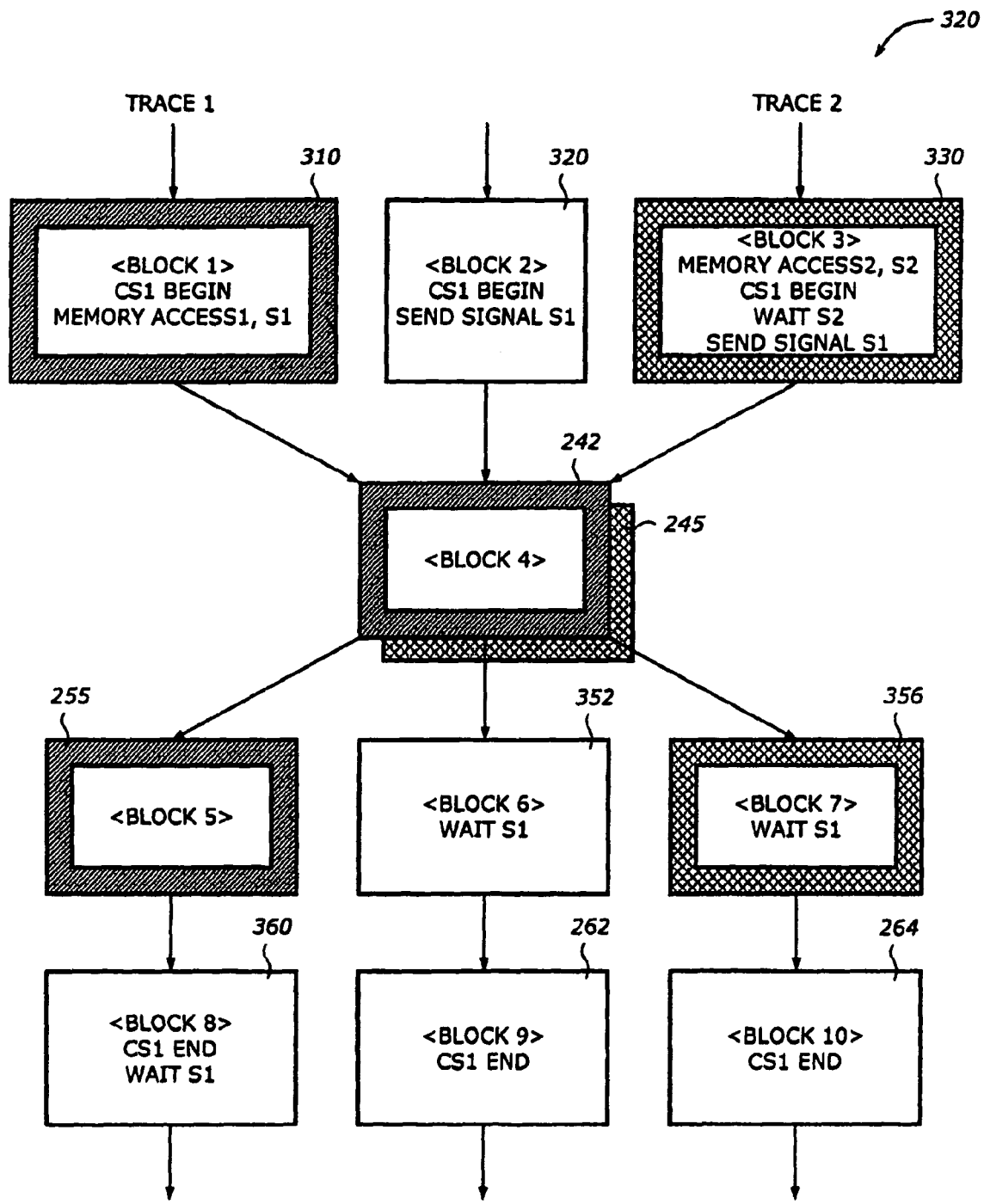
FIG. 3C is a diagram illustrating final moving of wait instruction according to one embodiment of the invention.

FIG. 3C is a diagram illustrating final moving of wait instruction according to one embodiment of the invention. Block 5 355 and block 8 260 in FIG. 3B become block 5 255 and block 8 360, respectively.

The wait instruction "wait s1" is moved from block 5 255 to block 8 360 because the color set of "wait s1" intersects with the color set of block 5. This means there should be any associated memory access instructions of "wait s1" are in the same critical section and on the same trace with "wait s1". "Memory access 1" is one of this kind of instruction in this example. The wait instructions "wait s1" in block 6 352 and block 7 356 remain there because these blocks do not belong to the trace 1.

After all the wait instructions or the beginnings of the critical sections sink across the basic blocks, the color information is updated to maintain the correctness of the program logic. The updating of the color information may be carried out by a pseudo-code as follows

```
Input: the coloring information and the code motion information
Output: the updated coloring information
for (each of the instructions of critical section begin that sinks out of
basic block b)
{
    colorset = {c | color c is associated with the particular critical
    section};
    BlockColorSet[b] -= colorset;
    for (each memory access i in b)
    {
        for (each wait instruction w in MemoryAccess2Waits[i])
            WaitColorSet[w] -= colorset;
    }
}
for (each wait instruction w that sinks into basic block b)
    WaitColorSet[w] = the intersection of WaitColorSet[w] and
    BlockColorSet[b];
```

Figure 4:
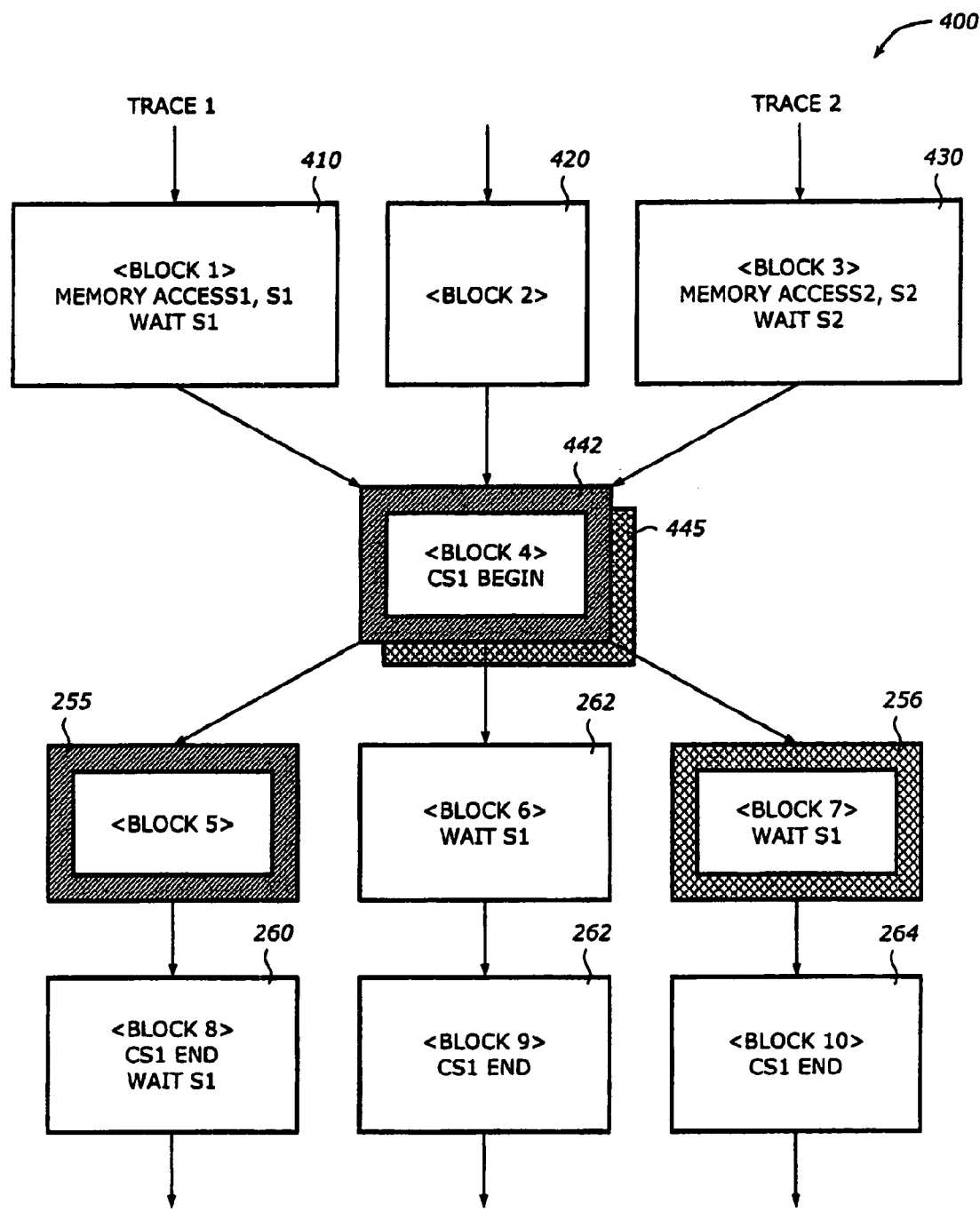
FIG. 4 is a diagram illustrating update of color information when sinking critical section begin according to one embodiment of the invention.

FIG. 4 is a diagram illustrating update of color information when sinking critical section begin according to one embodiment of the invention. The block 1 215, block 2 220, block 3 235, and blocks 4 242 and 245 in FIG. 2A become block 1 410, block 2 420, block 3 430, and blocks 4 442 and 445, respectively.

The instructions CS1 begin in blocks 1, 2, and 3 are moved to block 4. The colors of blocks 1 410, 3 430, and the instruction "wait s1" in block 1 410 are all set to empty or reset.

Figure 5:
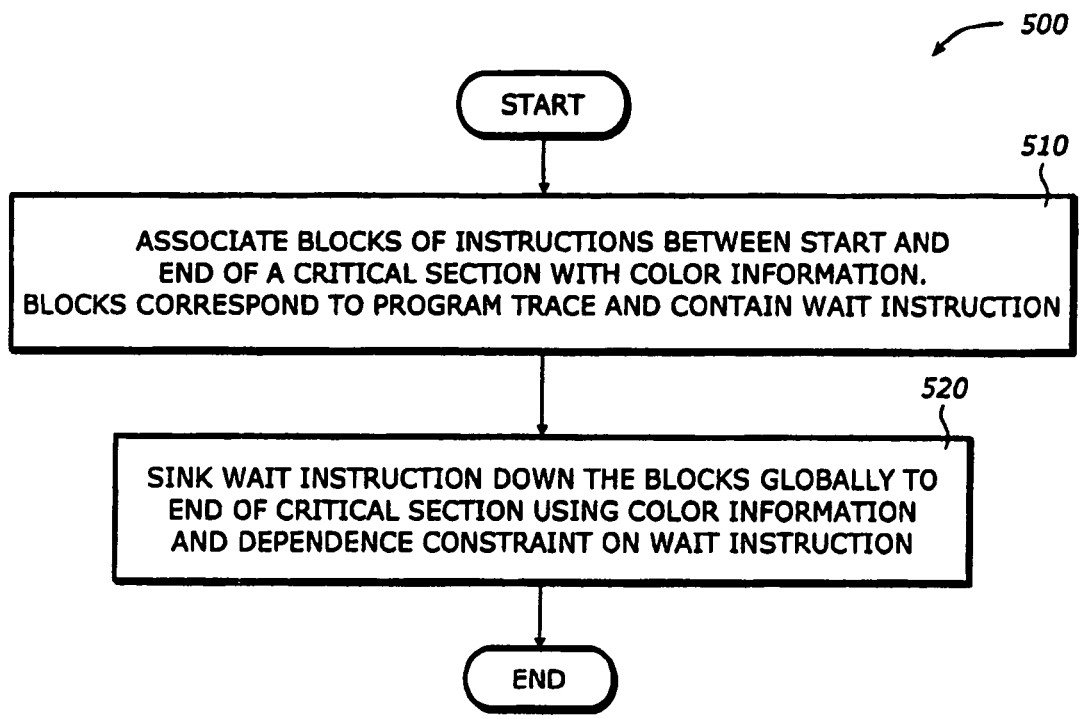
FIG. 5 is a flowchart illustrating a process to hide latency of a program trace according to one embodiment of the invention.

FIG. 5 is a flowchart illustrating a process 500 to hide latency of a program trace according to one embodiment of the invention. Each of the blocks in the process 500 may correspond to a module which may be a program module, a hardware circuit, a firmware module, or a combination of them. The process 500 may correspond to the program transformer 135 shown in FIG. 1B.

Upon START, the process 500 associates blocks of instructions between the start and the end of a critical section with color information (Block 510). The blocks correspond to a program trace and contain a wait instruction. Then, the process 500 sinks the wait instruction down the blocks globally to the end of the critical section using the color information and a dependence constraint on the wait instruction (Block 520). A dependence constraint may be a constraint that limits the mobility of an instruction due to a dependency or a relationship between that instruction with another instruction. For example, there is a dependence constraint between a memory access instruction and a wait instruction associated with the memory access. The process 500 is then terminated.

Figure 6:
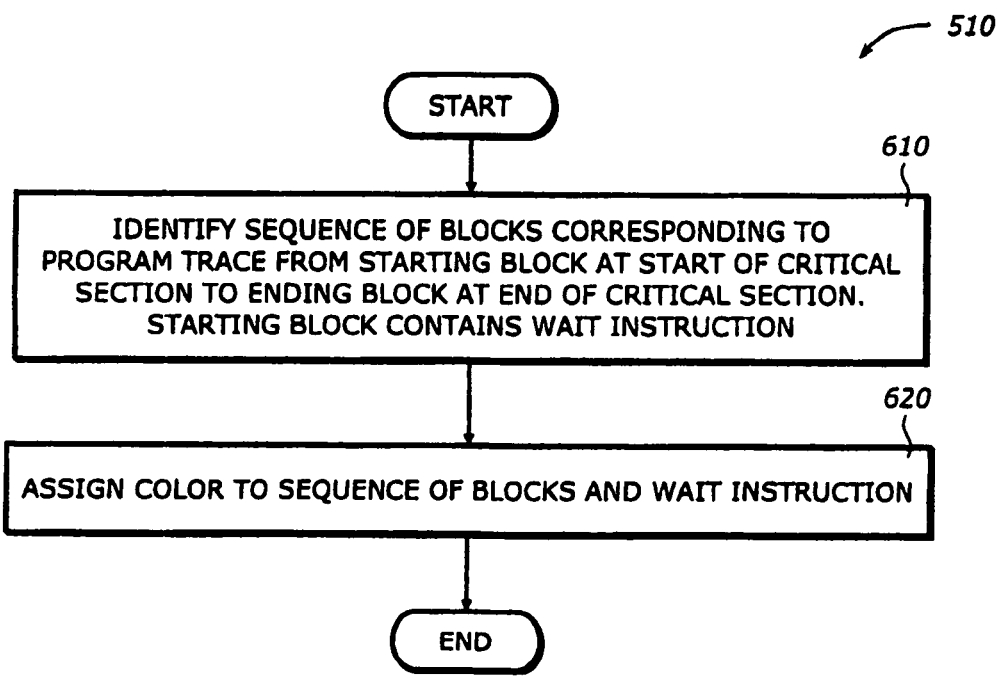
FIG. 6 is a flowchart illustrating a process to associate blocks with color information according to one embodiment of the invention.

FIG. 6 is a flowchart illustrating a process 510 to associate blocks with color information according to one embodiment of the invention. The process 510 may correspond to the example shown in FIG. 2B.

Upon START, the process 510 identifies a sequence of the blocks corresponding to the program trace from a starting block at the start of the critical section to an ending block at the end of the critical section (Block 610). The starting block contains the wait instruction. Then, the process 510 assigns a block color to the sequence of the blocks and a wait color to the wait instruction (Block 620). The block color or the wait color may be any uniquely identified code. In one embodiment, the block color or the wait color is a code that is incremented after an assignment. The process 510 is then terminated.

Figure 7:
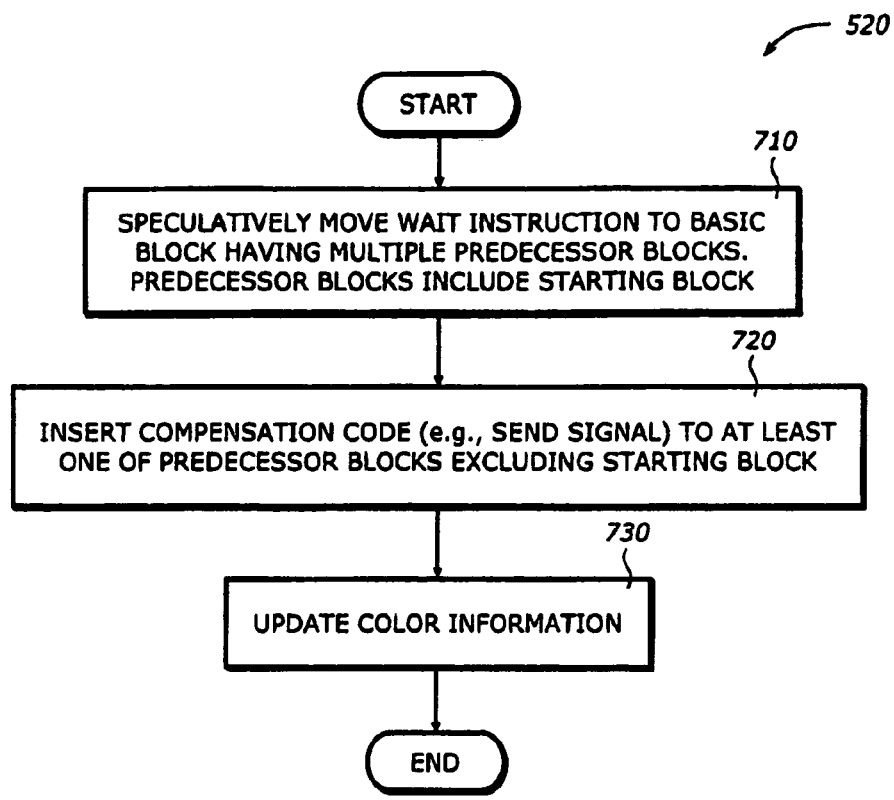
FIG. 7 is a flowchart illustrating a process to sink the wait instruction according to one embodiment of the invention.

FIG. 7 is a flowchart illustrating a process 520 to sink the wait instruction according to one embodiment of the invention. The process 520 may correspond to the example shown in FIG. 3A.

Upon START, the process 520 speculatively moves the wait instruction to a basic block having multiple predecessor blocks (Block 710). The multiple predecessor blocks include the starting block. Then, the process 520 inserts compensation code to at least one of the multiple predecessors blocks excluding the starting block (Block 720). This is because the starting block belongs to the current trace, and the other predecessor blocks do not belong to the current trace. Next, the process 520 updates the color information (Block 730) and is then terminated.

Figure 8:
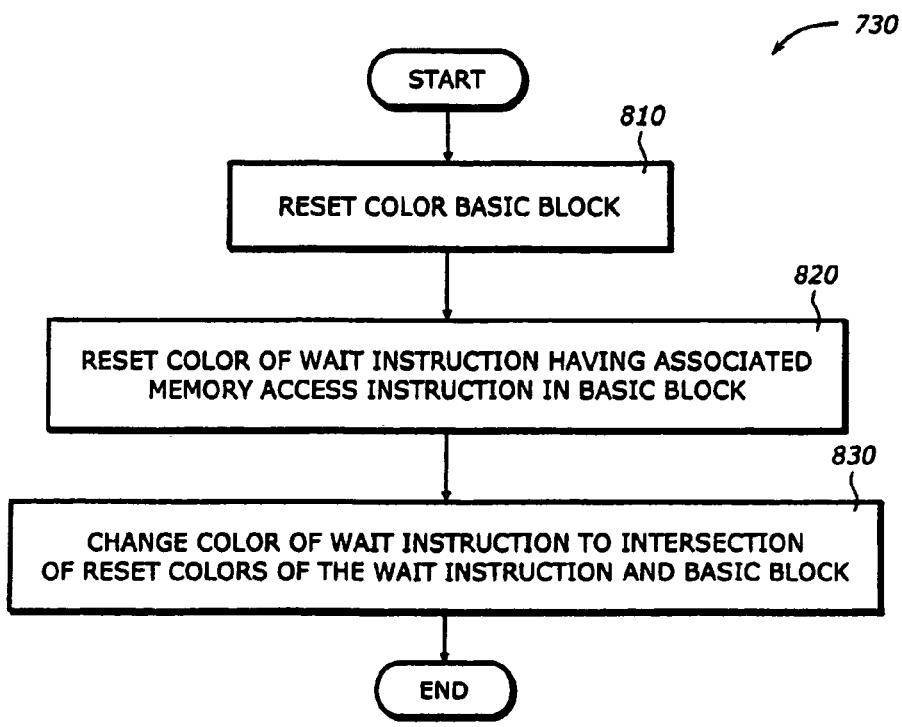
FIG. 8 is a flowchart illustrating a process to update the color information according to one embodiment of the invention.

FIG. 8 is a flowchart illustrating a process 730 to update the color information according to one embodiment of the invention. The process 730 may correspond to the example shown in FIG. 4.

Upon START, the process 730 resets the block color of the basic block (Block 810). In one embodiment, resetting may be performed by decrementing the color code. Next, the process 730 resets the wait color of the wait instruction having an associated memory access instruction in the basic block (Block 820). Then, the process 730 changes the color of the wait instruction to intersection of reset color of the wait instruction and the reset color of the basic block (Block 830). Then, the process 730 is terminated.

Figure 9:
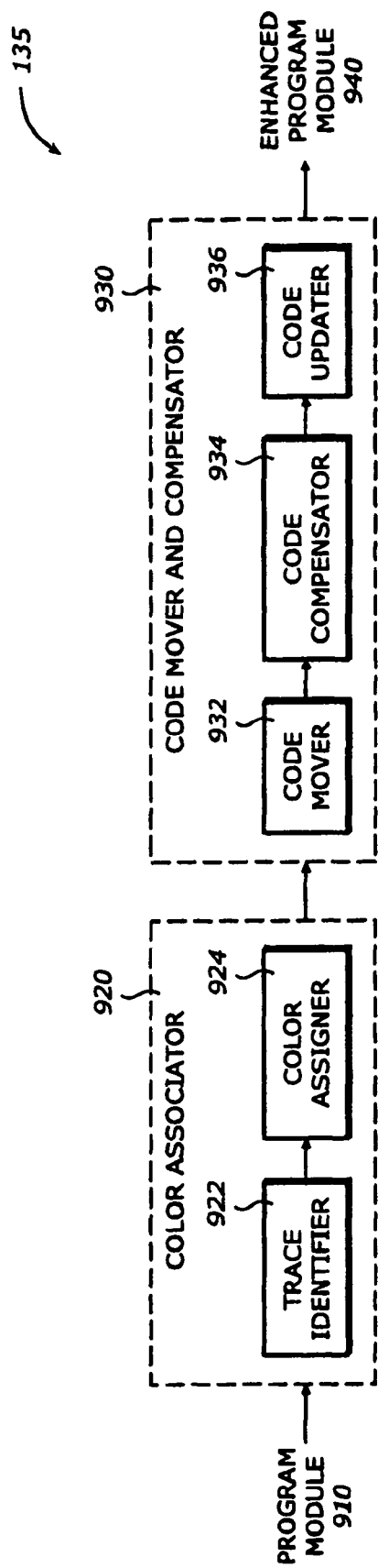
FIG. 9 is a diagram illustrating a compiler to enhance latency hiding according to one embodiment of the invention.

FIG. 9 is a diagram illustrating a program transformer 135 to enhance latency hiding according to one embodiment of the invention. The program transformer 135 may be implemented by software, hardware, firmware, or any combination of these elements. It includes a color associator 920 and a code mover and compensator 930. Note that the compiler 135 may include more or less than the above elements.

The color associator 920 associates blocks of instructions between start and end of a critical section with color information. The blocks correspond to a program trace and containing a wait instruction. The color associator 920 includes a trace identifier 922 and a color assigner 924. The trace identifier 922 identifies the program traces in a program module 910. It may collect blocks belonging to each program trace. It identifies critical sections, start and end of the critical sections, the memory access instructions, and all the relevant wait instructions. The relevant wait instructions are those instructions that are in the same critical section that contain the associated memory access instructions. The color assigner 924 colors, or assigns codes to, the blocks and the corresponding wait instruction for all the program traces identified by the trace identifier or collector 922.

The code mover and compensator 930 includes a code mover 932, a code compensator 934, and a color updater 936. The code mover 922 sinks the wait instruction down the blocks globally to the end of the critical section using the color information and a dependence constraint on the wait instruction. The code mover 922 moves the wait instruction to the basic block if the block color of the starting block and the wait color of the wait instruction have same color and if the wait instruction is ready. The code compensator 934 inserts a compensation code to predecessor blocks of a basic block. In one embodiment, it inserts a send signal to the at least one of the multiple predecessors excluding the starting block. The color updater 936 updates the color information to maintain program correctness. It resets block the color of the basic block, and the wait color of the wait instruction having an associated memory access instruction in the basic block. It may also change the wait color of the wait instruction to intersection of reset wait color of the wait instruction and the reset block color of the basic block.

The output of the code mover and compensator 930 is an enhanced program module 960. The enhanced program module 940 now has all wait instructions moved out of corresponding critical sections. Therefore, it may be processed by a multi-thread/multi-process module that hides memory access latencies.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method for compiling instructions for multiple processing threads comprising:
    receiving a program module;
    identifying blocks of instructions in the received program module;
    identifying critical sections of the program module;
    associating blocks of instructions between a start and an end of a mutually exclusive critical section with color information, the blocks corresponding to a program trace and containing a wait instruction associated with a memory access;
    associating the wait instruction with wait color information, wherein the wait color information is not related to the color information;
    sinking the wait instruction down the blocks globally across the blocks to the end of the critical section using the color information, the wait color information, and a dependence constraint on the wait instruction; and
    outputting an enhanced program module with the sunk wait instruction.

2. The method of claim 1 wherein associating the blocks comprises:
    identifying a sequence of the blocks corresponding to the program trace from a starting block at the start of the critical section to an ending block at the end of the critical section, the starting block containing the wait instruction; and
    assigning a color to the sequence of the blocks and a wait color to the wait instruction.

3. The method of claim 1 wherein sinking the wait instruction comprises:
    speculatively moving the wait instruction to a basic block in the identified blocks; having multiple predecessor blocks, the multiple predecessor blocks including a starting block;
    inserting compensation code to at least one of the multiple predecessor blocks excluding the starting block; and
    updating the color information and the wait color information.

4. The method of claim 3 wherein speculatively moving the wait instruction comprises:
    moving the wait instruction to the basic block if the starting block and the wait instruction have same color and if the wait instruction is ready.

5. The method of claim 3 wherein inserting the compensation code comprises:
    inserting a send signal to the at least one of the multiple predecessor blocks excluding the starting block.

6. The method of claim 3 wherein updating the color information and the wait color information comprises:
    resetting the color of the basic block; and
    resetting the color of the wait instruction having an associated memory access instruction in the basic block.

7. The method of claim 6 wherein updating the color information and the wait color information further comprises:
    changing the color of the wait instruction to intersection of reset color of the wait instruction and the reset color of the basic block.

8. A program transformer in a compiler for a program module for multiple processing threads comprising:
    a memory to store a program module and colors form blocks of instructions within the program module; and
    a processor to implement:
    a color assignor to associate blocks of instructions between start and end of a mutually exclusive critical section with color information, the blocks corresponding to a program trace and containing a wait instruction associated with access to the memory, and to associate the wait instructions with a wait color, wherein the wait color information is not related to the color information;
    a code mover and compensator coupled to the color assignor to sink the wait instruction down the blocks globally across the blocks to the end of the critical section using the color information, the wait color information, and a dependence constraint on the wait instruction; and
    an enhanced program module to receive the enhanced program module with the sunk wait instruction.

9. The program transformer of claim 8 wherein the color assignor comprises:
    a trace identifier to identify a sequence of the blocks corresponding to the program trace from a starting block at the start of the critical section to an ending block at the end of the critical section, the starting block containing the wait instruction; and
    the color assigner coupled to the trace identifier to assign a block color to the sequence of the blocks and a wait color to the wait instruction.

10. The program transformer of claim 8 wherein the code mover and compensator comprises:
    a code mover to speculatively move the wait instruction to a basic block in the identified blocks; having multiple predecessor blocks, the multiple predecessor blocks including a starting block;
    a code compensator to insert compensation code to at least one of the multiple predecessor blocks excluding the starting block; and
    a color updater to update the color information and the wait color information.

11. The program transformer of claim 10 wherein the code mover moves the wait instruction to the basic block if the block color of the starting block and the wait color of the wait instruction have same color and if the wait instruction is ready.

12. The program transformer of claim 10 wherein the code compensator inserts a send signal to the at least one of the multiple predecessor blocks excluding the starting block.

13. The program transformer of claim 10 wherein the color updater resets the block color of the basic block, and the wait color of the wait instruction having an associated memory access instruction in the basic block.

14. The program transformer of claim 10 wherein the color updater changes the wait color of the wait instruction to intersection of reset wait color of the wait instruction and the reset block color of the basic block.

15. A system comprising:
a network processor;
a host processor coupled to the network processor; and
a memory coupled to the host processor having a program transformer of a compiler to transform a program module to be executed on multiple threads of the network processor, the program transformer comprising:
a color assignor to associate blocks of instructions between start and end of a mutually exclusive critical section with color information, the blocks corresponding to a program trace and containing a wait instruction associated with access to the memory, and to associate the wait instruction with a wait color, wherein the wait color information is not related to the color information;
a code mover and compensator coupled to the color assignor to sink the wait instruction down the blocks globally across the blocks to the end of the critical section using the color information, the wait color information, and a dependence constraint on the wait instruction; and
an enhanced program module to receive the enhanced program module with the sunk wait instruction.

16. The system of claim 15 wherein the color assignor comprises:
a trace identifier to identify a sequence of the blocks corresponding to the program trace from a starting block at the start of the critical section to an ending block at the end of the critical section, the starting block containing the wait instruction; and
the color assignor coupled to the trace identifier to assign a block color to the sequence of the blocks and a wait color to the wait instruction.

17. The system of claim 15 wherein the code mover and compensator comprises:
a code mover to speculatively move the wait instruction to a basic block in the identified blocks; having multiple predecessor blocks, the multiple predecessor blocks including a starting block;
a code compensator to insert compensation code to at least one of the multiple predecessor blocks excluding the starting block; and
a color updater to update the color information and the wait color information.

18. The system of claim 17 wherein the code mover moves the wait instruction to the basic block if the block color of the starting block and the wait color of the wait instruction have same color and if the wait instruction is ready.

19. The system of claim 17 wherein the code compensator inserts a send signal to the at least one of the multiple predecessor blocks excluding the starting block.

20. The system of claim 17 wherein the color updater resets the block color of the basic block, and the wait color of the wait instruction having an associated memory access instruction in the basic block.

21. The system of claim 17 wherein the color updater changes the wait color of the wait instruction to intersection of reset wait color of the wait instruction and the reset block color of the basic block.

22. An article of manufacture comprising:
a machine-accessible non-transitory storage medium including data that, when accessed by a machine, cause the machine to perform operations comprising:
receiving a program module for multiple processing threads;
identifying blocks of instructions in the received program module;
identifying critical sections of the program module;
associating blocks of instructions between a start and an end of a mutually exclusive critical section with color information, the blocks corresponding to a program trace and containing a wait instruction associated with a memory access;
associating the wait instruction with wait color information, wherein the wait color information is not related to the color information;
sinking the wait instruction down the blocks globally across the blocks to the end of the critical section using the color information, the wait color information, and a dependence constraint on the wait instruction; and
outputting an enhanced program module with the sunk wait instruction.

23. The article of manufacture of claim 22 wherein the data causing the machine to perform associating the blocks comprises data that, when accessed by a machine, cause the machine to perform operations comprising:
identifying a sequence of the blocks corresponding to the program trace from a starting block at the start of the critical section to an ending block at the end of the critical section, the starting block containing the wait instruction; and
assigning a block color to the sequence of the blocks and a wait color to the wait instruction.

24. The article of manufacture of claim 22 wherein the data causing the machine to perform sinking the wait instruction comprises data that, when accessed by a machine, cause the machine to perform operations comprising:
speculatively moving the wait instruction to a basic block in the identified blocks; having multiple predecessor blocks, the multiple predecessor blocks including a starting block;
inserting compensation code to at least one of the multiple predecessor blocks excluding the starting block; and
updating the color information and the wait color information.

25. The article of manufacture of claim 24 wherein the data causing the machine to perform speculatively moving the wait instruction comprises data that, when accessed by a machine, cause the machine to perform operations comprising:
moving the wait instruction to the basic block if the block color of the starting block and
the wait color of the wait instruction have same color and if the wait instruction is ready.

26. The article of manufacture of claim 24 wherein the data causing the machine to perform inserting the compensation code comprises data that, when accessed by a machine, cause the machine to perform operations comprising:
inserting a send signal to the at least one of the multiple predecessor blocks excluding the starting block.

27. The article of manufacture of claim 24 wherein the data causing the machine to perform updating the color information and the wait color information comprises data that, when accessed by a machine, cause the machine to perform operations comprising:

resetting the block color of the basic block; and resetting the wait color of the wait instruction having an associated memory access instruction in the basic block.

28. The article of manufacture of claim 27 wherein the data causing the machine to perform updating the color information and the wait color information further comprises data that, when accessed by a machine, cause the machine to perform operations comprising:

changing the wait color of the wait instruction to intersection of reset block color of the wait instruction and the reset block color of the basic block.

* * * * *